No. 629,649. Patented July 25, 1899.
J. BOND.
MATCH SAFE.
(Application filed Mar. 29, 1899.)
(No Model.)
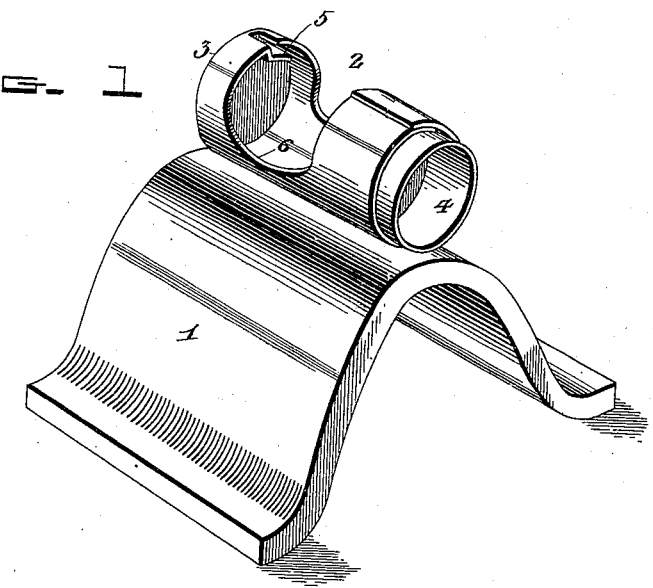
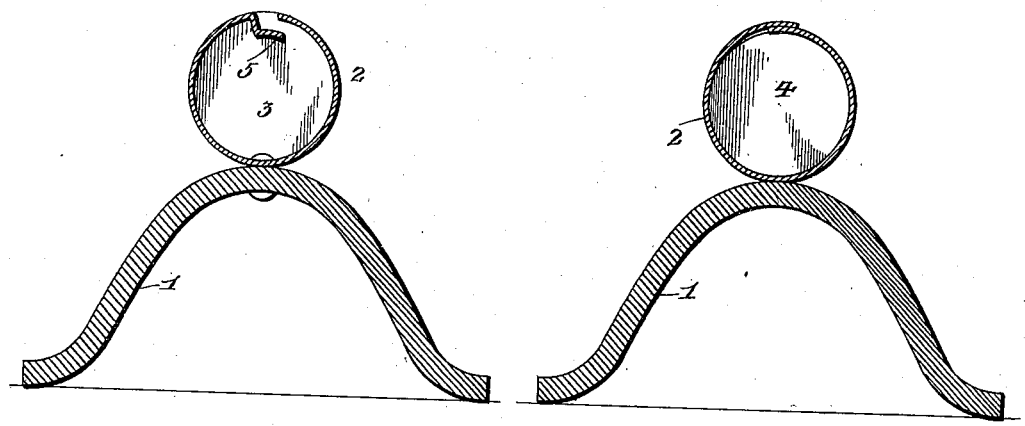
Witnesses
Inventor
John Bond
by
H. B. Willson & Co
Attorneys

UNITED STATES PATENT OFFICE.

JOHN BOND, OF COULTERVILLE, CALIFORNIA.

MATCH-SAFE.

SPECIFICATION forming part of Letters Patent No. 629,649, dated July 25, 1899.

Application filed March 29, 1899. Serial No. 710,965. (No model.)

*To all whom it may concern:*

Be it known that I, JOHN BOND, a citizen of the United States, residing at Coulterville, in the county of Mariposa and State of California, have invented certain new and useful Improvements in Single-Delivery Match-Safes or Toothpick-Holders; and I do declare the following to be a full, clear, and exact description of the invention, such as will enable others skilled in the art to which it appertains to make and use the same.

The invention has relation to single-delivery match-safes or toothpick-holders.

The object of the invention is to provide a device of this character which shall be simple of construction, inexpensive of production, and from which it will be impossible to remove at one time more than one match or toothpick.

With this object in view the invention consists in certain features of construction and combination of parts, which will be hereinafter fully set forth, and particularly pointed out in the appended claim.

In the drawings, Figure 1 is a perspective view of the device. Fig. 2 is a vertical cross-sectional view through one end of the device, and Fig. 3 is a similar view through the other end of the device.

In the drawings, 1 denotes the base, preferably made of metal and curved, as shown.

2 denotes the receptacle, tubular in form and provided with a fixed head 3 and a removable cap 4. This receptacle is preferably formed of sheet metal and is slitted longitudinally and formed at one end with a depressed lip 5, that projects under the edge of the split portion. There is an enlarged transverse opening 6 formed intermediate the ends of the holder to display the matches or toothpicks and enable a person to grasp them. The cap 4 does not surround the end of the tubular portion of the holder, but fits within the tubular portion and is adapted to be slid up against the ends of the matches, so as to adapt the holder to different lengths of matches and prevent short ones from being removed from the holder by tilting them and withdrawing them from the central opening therein.

In operation when it is desired to remove a match or toothpick the same is grasped by the fingers and then moved rearwardly to follow the curve of the receptacle and has one of its ends guided out of the receptacle by the depressed lip 5. The distance between the free end of this lip and the upper wall of the receptacle is equal to the thickness of a match or toothpick, so that it will be impossible to remove more than one match or toothpick at a time. The receptacle may be refilled by removing the cap.

When the device is constructed, if desired, the base may be provided with a roughened surface upon which to strike the matches.

Having thus described the invention, what is claimed, and desired to be secured by Letters Patent, is—

The combination with the supporting-base, of the tubular receptacle provided with a fixed head and a removable cap which fits within one end of the receptacle and is adjustable lengthwise thereof, said receptacle being slitted longitudinally and formed at one end with a depressed lip that projects under the edge of the slit portion, said receptacle being formed with an enlarged opening intermediate the ends of the holder to display the matches or toothpicks and enable them to be grasped in removal, substantially as and for the purpose set forth.

In testimony whereof I have hereunto set my hand in presence of two subscribing witnesses.

JOHN BOND.

Witnesses:
 E. G. MILLER,
 JUSTUS H. ROGERS.